United States Patent [19]

Okumura et al.

[11] Patent Number: 4,470,386
[45] Date of Patent: Sep. 11, 1984

[54] FLOW CONTROL DEVICE OF A HELICALLY-SHAPED INTAKE PORT

[75] Inventors: Takeshi Okumura; Kiyoshi Nakanishi, both of Susono; Kiyoshi Isogai, Toyota; Ituo Koga, Okazaki, all of Japan

[73] Assignee: Toyota Jidosha Kabushiki Kaisha, Aichi, Japan

[21] Appl. No.: 398,565

[22] Filed: Jul. 15, 1982

[30] Foreign Application Priority Data

Jul. 27, 1981 [JP] Japan .............................. 56-110228[U]

[51] Int. Cl.³ ............................................. F02B 31/00
[52] U.S. Cl. ................................. 123/188 M; 123/306
[58] Field of Search ............... 123/52 M, 188 M, 306, 123/308, 432

[56] References Cited

U.S. PATENT DOCUMENTS

| 3,850,479 | 11/1974 | Boyhont et al. ..................... 302/29 |
| 4,174,686 | 11/1979 | Shimizu et al. ................. 123/188 M |
| 4,196,701 | 4/1980 | Tamura et al. .................. 123/188 M |
| 4,201,165 | 5/1980 | Tanaka et al. ....................... 123/568 |
| 4,253,432 | 3/1981 | Nohira et al. .................... 123/52 M |
| 4,256,062 | 3/1981 | Schafer ............................ 123/52 M |
| 4,257,384 | 3/1981 | Matsumoto ......................... 123/575 |
| 4,312,309 | 1/1982 | Nakanishi et al. ............. 123/188 M |
| 4,411,226 | 10/1983 | Okumura et al. .............. 123/188 M |

FOREIGN PATENT DOCUMENTS

| 2059008 | 6/1972 | Fed. Rep. of Germany . |
| 2308327 | 10/1973 | Fed. Rep. of Germany ... 123/188 M |
| 0143289 | 8/1980 | German Democratic Rep. ........................... 123/188 M |
| 52-127113 | 9/1977 | Japan ............................. 123/188 M |
| 0058129 | 5/1979 | Japan . |
| 0054922 | 5/1981 | Japan . |
| 0068519 | 4/1982 | Japan . |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A rotary valve is arranged in the bypass passage and has an arm connected to a vacuum operated diaphragm apparatus. The rotary valve has a stop which is engageable with the arm. The arm is normally in engagement with the stop due to the spring force of a coil spring for retaining the rotary valve precisely at the maximum open position.

9 Claims, 12 Drawing Figures

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight intake passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve actuated by an actuator, is arranged in the bypass passage and opened under the operation of the actuator when the amount of air fed into the cylinder of the engine is larger than a predetermined amount. In this flow control device, when the amount of air fed into the cylinder of the engine is large, that is, when the engine is operating under a heavy load at a high speed, since a part of air introduced into the inlet passage portion is fed into the helical portion of the helically-shaped intake port via the bypass passage, the flow resistance of the helically-shaped intake port is reduced. Thus, it is possible to obtain a high volumetric efficiency. However, this flow control device merely indicates a basic principle of operation. Therefore, in order to put such a flow control device into the practical use, various problems to be solved are present as to how to reduce the manufacturing time and the manufacturing cost; how to easily manufacture the flow control device; and how to obtain a reliable operation of the flow control device.

SUMMARY OF THE INVENTION

An object of the present invention is to provide a flow control device of a helically-shaped intake port, having a construction suited for putting the basic principle of operation into practical use.

According to the present invention, there is provided a device for controlling the flow in a helically-shaped intake port of an internal combustion engine, a said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion; a rotary valve arranged in said bypass passage and being rotatable between a maximum open position and a closed position, said rotary valve having an arm connected thereto; stationary stop means arranged to be engageable with said arm for retaining said rotary valve at said maximum open position; spring means biasing said rotary valve in a direction where said rotary valve opens for engaging said arm with said stop means; and actuating means having a connecting rod connected to said arm via a lost motion mechanism for actuating said rotary valve via said connecting rod in response to a change in the amount of air fed into the intake port to retaining said rotary valve at said maximum open position or said closed position when said amount of air is larger or smaller than a predetermined value, respectively.

The present invention may be more fully understood from the description of preferred embodiment of the invention set forth below, together with the accompanying drawings.

DESCRIPTION OF A PREFERRED EMBODIMENT

Figure 1:
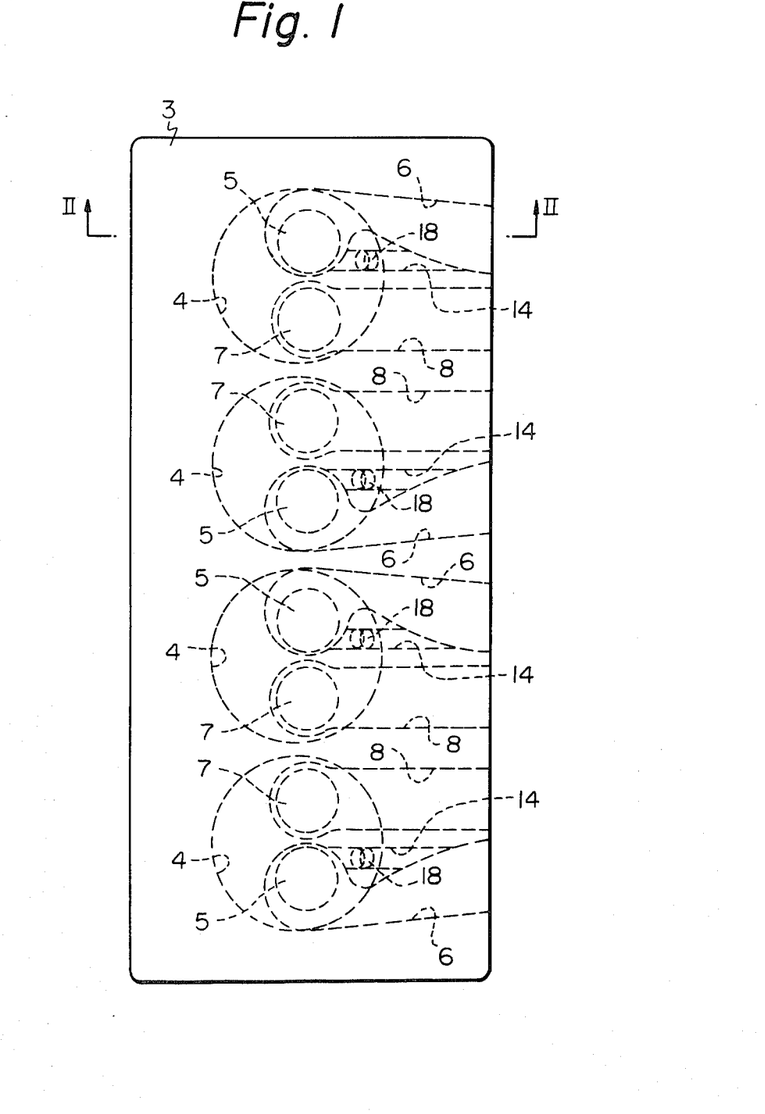
FIG. 1 is a plan view of an internal combustion engine according to the present invention.
Figure 2:
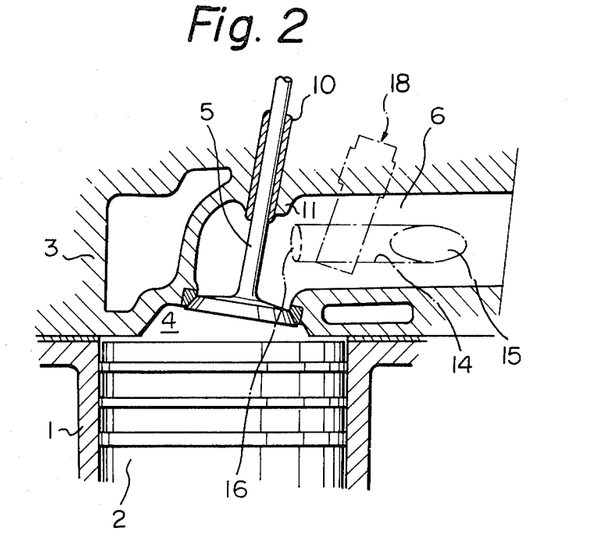
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
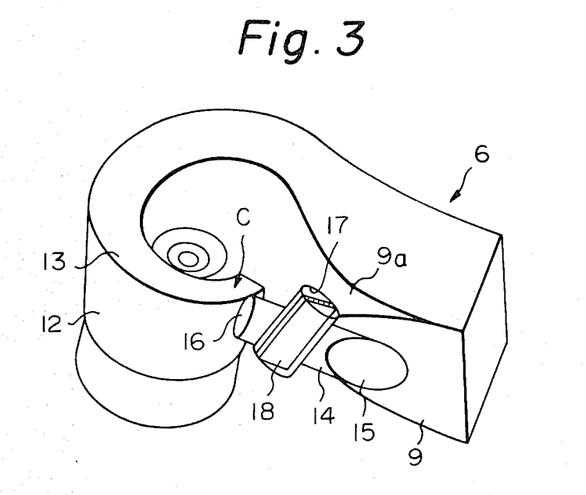
FIG. 3 is a perspective view schematically illustrating the shape of a helically shaped-intake port.
Figure 4:
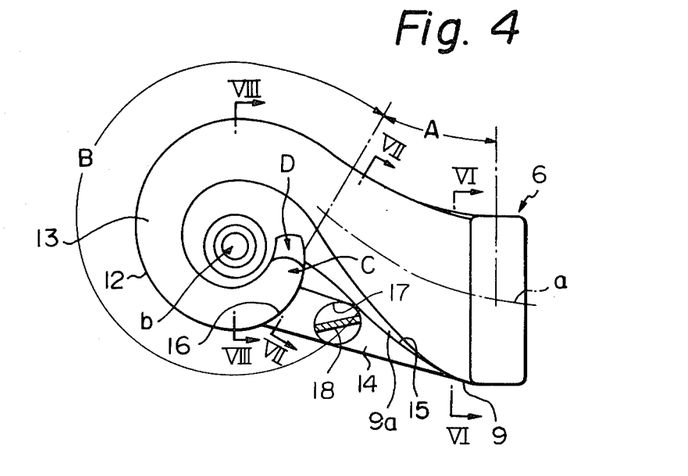
FIG. 4 is a plan view of FIG. 3.
Figure 5:
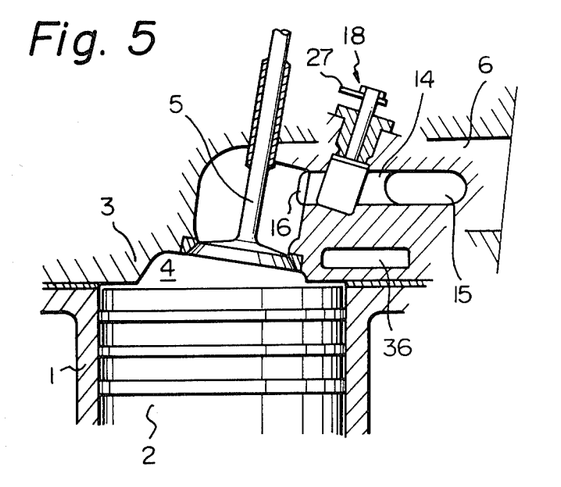
FIG. 5 is a cross-sectional view taken along the by-pass passage in FIG. 3.
Figure 6:
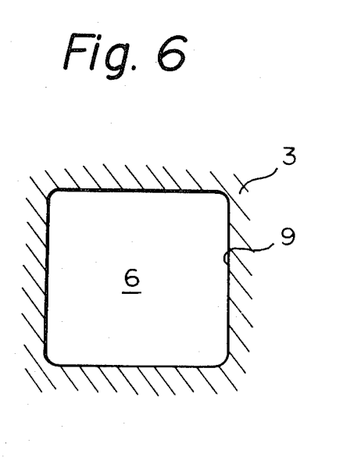
FIG. 6 is a cross-sectional view taken along the line VI—VI in FIG. 4.
Figure 7:
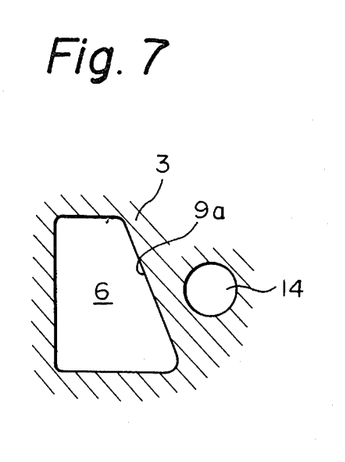
FIG. 7 is a cross-sectional view taken along the line VII—VII in FIG. 4.
Figure 8:
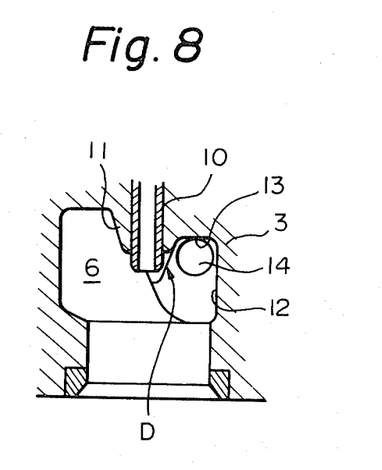
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be directed downwards. The width of the inclined wall portion 9a is gradually increased towards the helical portion B, and as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

Figures 9, 10, 11:
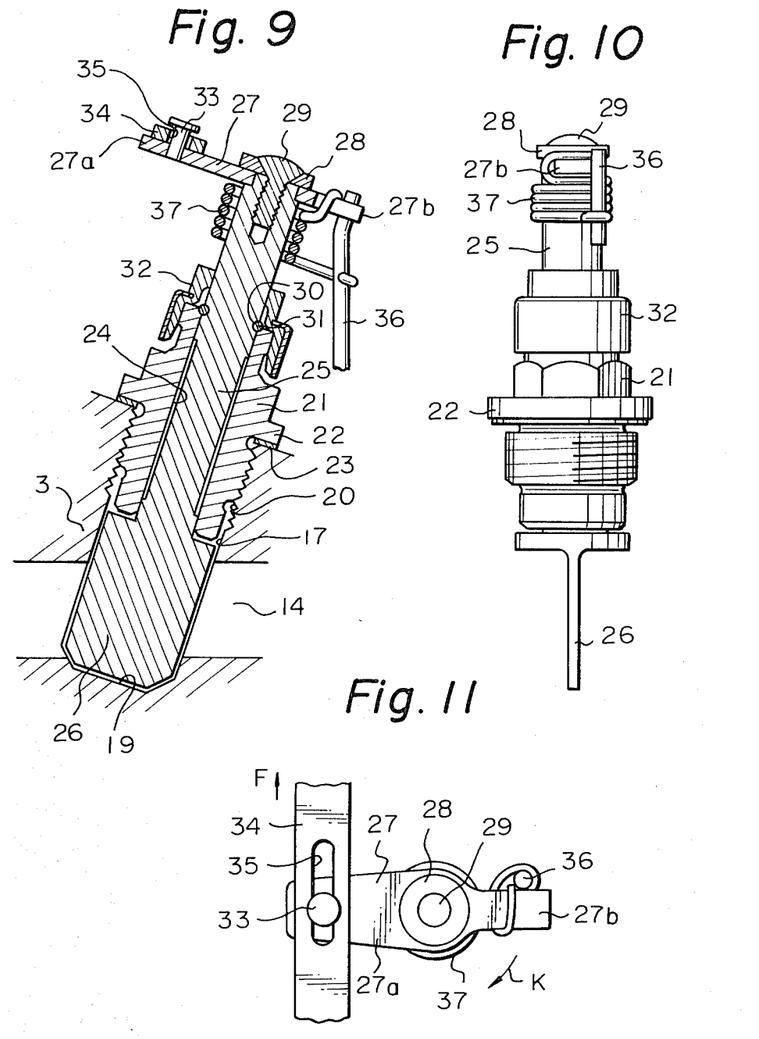
FIG. 9 is a cross-sectional side view of a rotary valve.
FIG. 10 is a side view of FIG. 9.
FIG. 11 is a plan view of FIG. 9.

As illustrated in FIGS. 1 through 5, bypass passages 14, branched off the inlet passage portions A of the corresponding intake ports 6 and having a substantially uniform cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6. Each of the outlet openings 16 of the bypass passages 14 is formed on the upper end portion of the side wall 12 at the helix terminating portion C of the corresponding intake port 6. In addition, valve insertion bores 17, extending across the corresponding bypass passages 14, are formed in the cylinder head 3, and rotary valves 18, each functioning as a flow control valve, are inserted into the corresponding valve insertion bores 17. Referring to FIG. 9, each of the valve insertion bores 17 is a cylindrical bore drilled downwardly from the upper surface of the cylinder head 3 and having a uniform diameter over the entire length thereof. The valve insertion bore 17 extends downward beyond the bypass passage 14, and thus, a recess 19 is formed on the bottom wall of the bypass passage 14. An internal thread 20 is formed on the upper portion of the valve insertion bore 17, and a rotary valve holder 21 is screwed into the internal thread 20. The rotary valve holder 21 has a circumferential flange 22 on the outer circumferential wall thereof, and a seal member 23 is inserted between the flange 22 and the cylinder head 3. A bore 24 is formed in the rotary valve holder 21, and a valve shaft 25 of the rotary valve 18 is rotatably inserted into the bore 24. A thin plate-shaped valve body 26 is fixed onto the lower end of the valve shaft 25, and an arm 27 is fixed onto the top end of the valve shaft 25 by means of a bolt 29 via a washer 28. A ring groove 30 is formed on the outer circumferential wall of the valve shaft 25 at a level which is almost the same as that of the top end face of the rotary valve holder 21, and a C-shaped positioning ring 31 is fitted into the ring groove 30. In addition, a seal member 32 is inserted onto the valve shaft 25 and fitted onto the upper portion of the rotary valve holder 21.

As illustrated in FIGS. 9 through 11, the arm 27 comprises a first arm portion 27a and a second arm portion 27b extending in a direction which is opposite to the extending direction of the first arm portion 27a. A pin 33 is fixed onto the tip of the first arm portion 27a. The first arm portions 27a of the arms 27 of the rotary valves 18 which are provided for the corresponding cylinders are interconnected to each other by means of a connecting rod 34. The connecting rod 34 has a plurality of slots 35 formed thereon and provided for the corresponding rotary valves 18, and the pins 33 of the arms 27 are loosely fitted into the corresponding slots 35. The slots 35 and the corresponding pins 33 construct a lost motion mechanism and, thus, the first arm portions 27a of the arms 27 are connected to the connecting rod 34 via the lost motion mechanism. Stops 36, each being engageable with the second arm portion 27b of the corresponding arm 27, are fixed on the cylinder head 3 or the rotary valve holders 21. In addition, coil springs 37 are inserted onto the corresponding valve shafts 25. Some ends of the coil springs 37 are hooked on the corresponding second arm portions 27b, and the other ends of the coil springs 37 are hooked on the corresponding stops 36. The rotary valves 18 are continuously biased in a direction where the rotary valves 18 open by means of the corresponding coil springs 37 so that the second arm portions 27b are pressed in contact with the corresponding stops 36 in order to maintain the degree of opening of the rotary valves 18 at a maximum.

Figure 12:
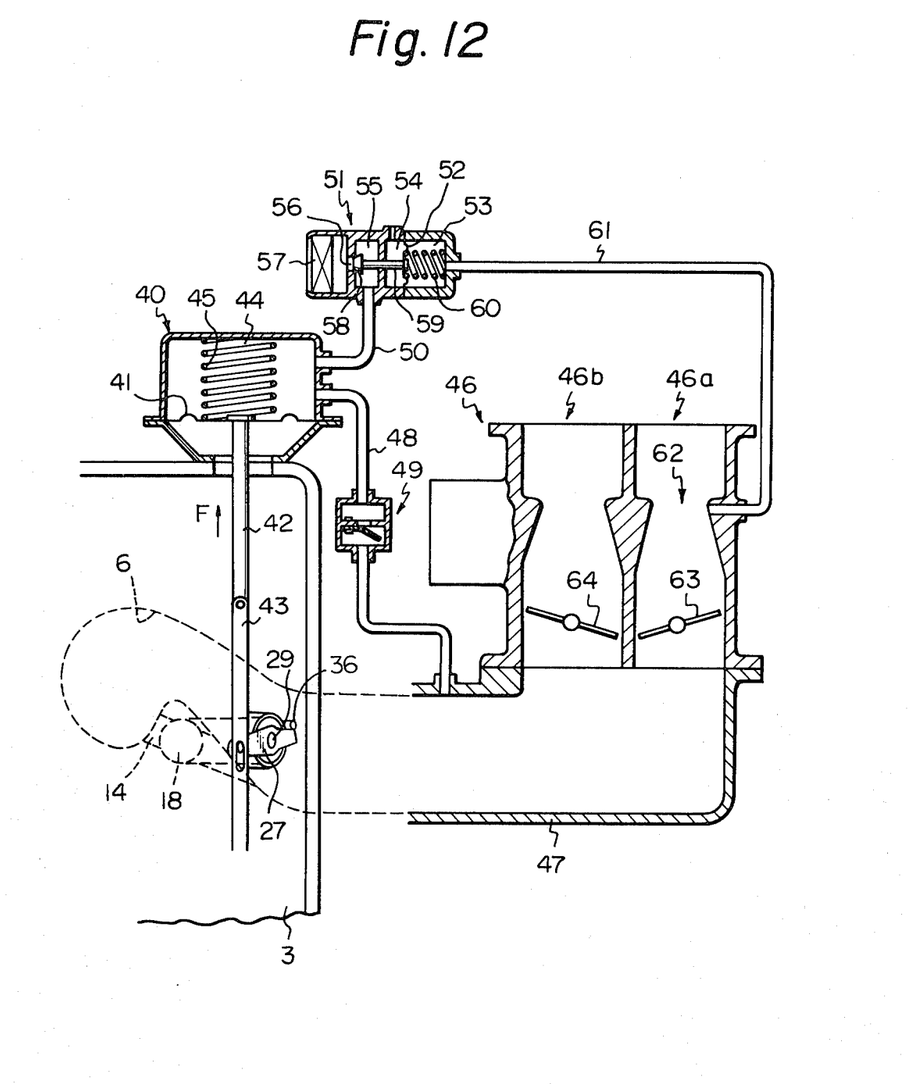
FIG. 12 is a view illustrating the entirety of a flow control device.

Referring to FIG. 12, the end portion of the connecting rod 34, interconnecting the arms 27 of the rotary valves 18 to each other, is connected to a control rod 42 which is fixed onto a diaphragm 41 of a vacuum operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor A and a secondary carburetor B, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52, and in addition, the control valve 51 further comprises a valve chamber 55 arranged adjacent to the atmospheric pressure chamber 54. The valve chamber 55 is connected, on one end, to the vacuum chamber 44 via the atmosphere conduit 50, and on the other end, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53, and the vacuum chamber 53 is connected to a venturi portion 62 of the primary carburetor A via a vacuum conduit 61.

The carburetor 46 is a conventional carburetor. Consequently, when the opening degree of a primary throttle valve 63 is increased beyond a predetermined degree, a secondary throttle valve 64 is opened, and when the primary throttle valve 63 is fully opened, the secondary throttle valve 64 is also fully opened. The level of vacuum produced in the venturi portion 62 of the primary carburetor A is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves towards the right in FIG. 12 against the compression spring 60. As a result of this, the valve body 58 opens the valve port 56 and, thus, the vacuum chamber 44 of the diaphragm apparatus 40 opens to the atmosphere. At this time, the diaphragm 41 moves downward in FIG. 12 due to the spring force of the compression spring 45. As a result, the connecting rod 34 also moves and reaches a position illustrated in FIGS. 9 through 11. Consequently, at this time, the second arm portions 27b of the arms 27 abut against the corresponding stops 36, and thus, the degree of opening of the rotary valves 18 is maintained precisely at a maximum.

On the other hand, in the case wherein the opening degree of the primary throttle valve 63 is small, since the vacuum produced in the venturi portion 62 is small, the diaphragm 52 of the control valve 51 moves towards the left in FIG. 13 due to the spring force of the compression spring 60 and, as a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produced in the vacuum chamber 44, and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 12 against the compression spring 45, and thus, the connecting rod 34 moves in the direction illustrated by the arrow F in FIGS. 11 and 12. As a result of this, since the ends of the slots 35 of the connecting rod 34 come into engagement with the corresponding pins 33, the rotary valves 18 are rotated in the direction illustrated by the arrow K in FIG. 11, and thus, each of the rotary valves 18 shuts off the corresponding bypass passage 14. Consequently, when the engine is operating at a low speed under a light load, the bypass passage 14 is closed by the rotary valve 18. In the case wherein the engine speed is low even if the engine is operating under a heavy load, and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 14 is closed by the rotary valve 18.

As mentioned above, when the engine is operating at a low speed under a light load, that is, when the amount of air fed into the cylinder of the engine is small, the rotary valve 18 closes the bypass passage 14. At this time, the mixture introduced into the inlet passage portion A moves downward while swirling along the upper wall 13 of the helical portion B. Then, since the mixture while swirling flows into the combustion chamber 4, a strong swirl motion is created in the combustion chamber 4.

When the engine is operating at a high speed under a heavy load, that is, when the amount of air fed into the cylinder of the engine is large, since the rotary valve 18 opens the bypass passage 14, a part of the mixture introduced into the inlet passage portion A is fed into the helical portion B via the bypass passage 14 having a low flow resistance. Since the flow direction of the mixture stream flowing along the upper wall 13 of the helical portion B is deflected downward by the steepling inclined wall D of the helix terminating portion C, a great vacuum is produced at the helix terminating portion C, that is, in the outlet opening 16 of the bypass passage 14. Consequently, since the pressure difference between the vacuum in the inlet passage portion A and the vacuum in the helix terminating portion C becomes large, a large amount of the mixture is fed into the helical portion B via the bypass passage 14 when the rotary valve 18 opens. As mentioned above, when the engine is operating at a high speed under a heavy load, since the rotary valve 18 opens, the entire flow area of the intake port 6 is increased, and a large amount of the mixture is fed into the helical portion B via the bypass passage 14 having a low flow resistance. As a result of this, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small, and thus, makes it possible to further increase a volumetric efficiency when the engine is operating at a high speed under a heavy load.

According to the present invention, by connecting the arms of the rotary valves to the vacuum operated diaphragm apparatus via the lost motion mechanism and defining the maximum open position of the rotary valves by using the stops which are engageable with the arms of the corresponding rotary valves, it is possible to retain the rotary valves precisely at the maximum open position. As a result of this, since the flow resistance of the bypass passages is minimized, it is possible to obtain a high volumetric efficiency when the engine is operating at a high speed under a heavy load.

While the invention has been described with reference to a specific embodiment chosen for purposes of illustration, it should be apparent that numerous modifications could be made thereto by those skilled in the art without departing from the spirit and scope of the invention.

We claim:
1. A device for controlling the flow in a helically-shaped intake port of an internal combustion engine, said intake port comprising a helical portion formed around an intake valve, and a substantially straight inlet passage portion tangentially connected to the helical portion and having a helix terminating portion, said device comprising:
- a bypass passage branched off from the inlet passage portion and connected to the helix terminating portion of the helical portion;
- a rotary valve arranged in said bypass passage and being rotatable between a maximum open position and a closed position, said rotary valve having an arm connected thereto;
- stationary stop means arranged to be engageable with said arm for retaining said rotary valve at said maximum open position;
- spring means biasing said rotary valve in a direction where said rotary valve opens for engaging said arm with said stop means; and
- an actuating means having a connecting rod connected to said arm via a lost motion mechanism for actuating said rotary valve via said connecting rod in response to a change in an amount of air fed into the intake port for retaining said rotary valve at said maximum open position or said closed position when said amount of air is larger or smaller than a predetermined value, respectively.

2. A device according to claim 1, wherein said connecting rod has a slot formed thereon, and said arm has a pin which is loosely fitted into said slot, said pin and said slot constructing said lost motion mechanism.

3. A device according to claim 1, wherein said rotary valve comprises a valve shaft onto which said arm is fixed, said spring means being arranged between said arm and said stop means.

4. A device according to claim 3, wherein said spring means is a coil spring inserted onto said valve shaft.

5. A device according to claim 3, wherein said arm comprises a first arm portion connected to said connecting rod, and a second arm portion arranged to be engageable with said stop means and extending in a direction which is opposite to an extending direction of said first arm portion.

6. A device according to claim 1, wherein said actuating means comprises a vacuum chamber, a diaphragm connected to said connecting rod and actuated in response to a change in the level of the vacuum in said vacuum chamber, and a control apparatus maintaining the level of the vacuum in said vacuum chamber at the maximum vacuum which has been produced in the intake port when the amount of air fed into the intake port is smaller than said predetermined value and connecting said vacuum chamber to the atmosphere when said amount of air is larger than said predetermined value.

7. A device according to claim 6, wherein said control apparatus comprises a check valve arranged between the intake port and said vacuum chamber for allowing only the outflow of air from said vacuum chamber, and a control valve for controlling a fluid connection between said vacuum chamber and the atmosphere to connect said vacuum chamber to the atmosphere when said amount of air is larger than said predetermined value.

8. A device according to claim 7, wherein the engine comprises a carburetor connected to the intake port and having a venturi portion, said control valve being actuated in response to a change in the level of the vacuum produced in said venturi portion.

9. A device according to claim 8, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *